(12) United States Patent
Martin, Jr. et al.

(10) Patent No.: US 7,739,303 B2
(45) Date of Patent: Jun. 15, 2010

(54) METHOD, SYSTEM AND PROGRAM PRODUCT FOR VERIFYING ACCESS TO A DATA OBJECT

(75) Inventors: James A. Martin, Jr., Endicott, NY (US); Douglas G. Murray, Johnson City, NY (US); Diane C. Rauch, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 10/898,099

(22) Filed: Jul. 22, 2004

(65) Prior Publication Data

US 2006/0020599 A1 Jan. 26, 2006

(51) Int. Cl.
*G06F 7/00* (2006.01)
(52) U.S. Cl. .................. 707/783; 707/787; 707/999.009
(58) Field of Classification Search .................. 707/900, 707/9, 783, 787, 999.09; 726/28; 713/182
See application file for complete search history.

(56) References Cited

U.S. PATENT DOCUMENTS

| | | | |
|---|---|---|---|
| 5,469,556 A * | 11/1995 | Clifton ........................ 711/163 |
| 5,469,576 A | 11/1995 | Dauerer et al. |
| 5,564,016 A * | 10/1996 | Korenshtein .................... 726/3 |
| 5,627,967 A * | 5/1997 | Dauerer et al. ................. 726/2 |
| 5,881,225 A * | 3/1999 | Worth .......................... 726/17 |
| 5,930,801 A * | 7/1999 | Falkenhainer et al. ... 707/103 R |
| 6,061,684 A * | 5/2000 | Glasser et al. ................. 707/9 |
| 6,092,201 A * | 7/2000 | Turnbull et al. ................ 726/4 |
| 6,101,539 A * | 8/2000 | Kennelly et al. ............ 709/223 |
| 6,141,754 A * | 10/2000 | Choy ............................ 726/1 |
| 6,141,778 A * | 10/2000 | Kane et al. ..................... 726/4 |
| 6,330,572 B1 * | 12/2001 | Sitka .......................... 707/205 |
| 6,678,682 B1 * | 1/2004 | Jenkins et al. ................. 707/9 |
| 7,260,555 B2 * | 8/2007 | Rossmann et al. ............ 705/51 |
| 2003/0093413 A1 * | 5/2003 | Dettinger et al. ............... 707/3 |
| 2003/0101341 A1 | 5/2003 | Kettler, III et al. |

\* cited by examiner

*Primary Examiner*—Miranda Le
(74) *Attorney, Agent, or Firm*—Anna Linne; Hoffman Warnick LLC

(57) ABSTRACT

An improved solution for verifying access to a data object. In particular, the invention automatically determines when access to the data object requires verification and provides an owner of the data object a set of current users for verification. The set of current users can include all or a subset of the users/user groups that have access to the data object. Additionally, an indication of one or more attributes of each user can be provided to the owner to assist in verification. Access information can be updated based on a response from the owner.

14 Claims, 4 Drawing Sheets

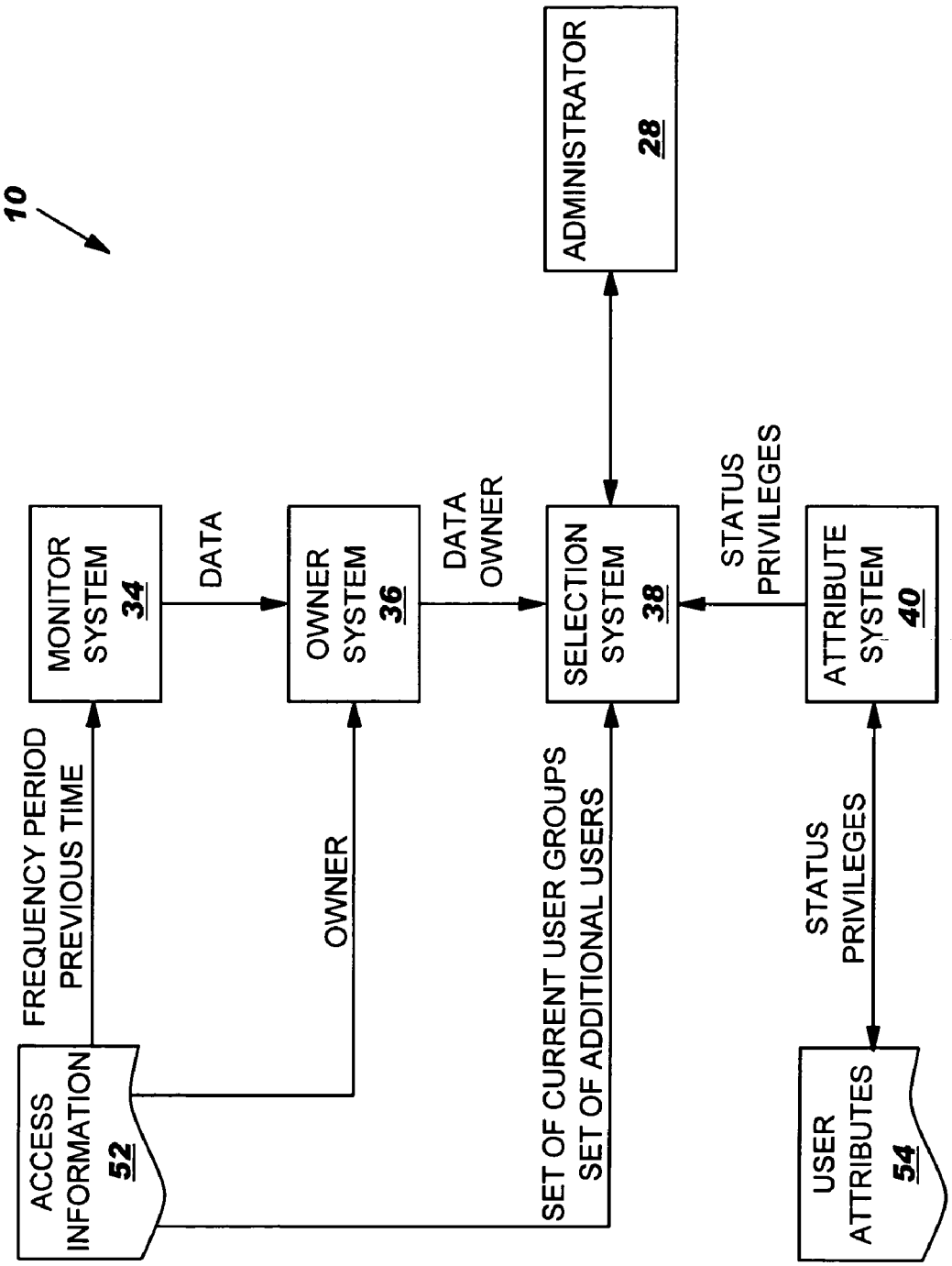

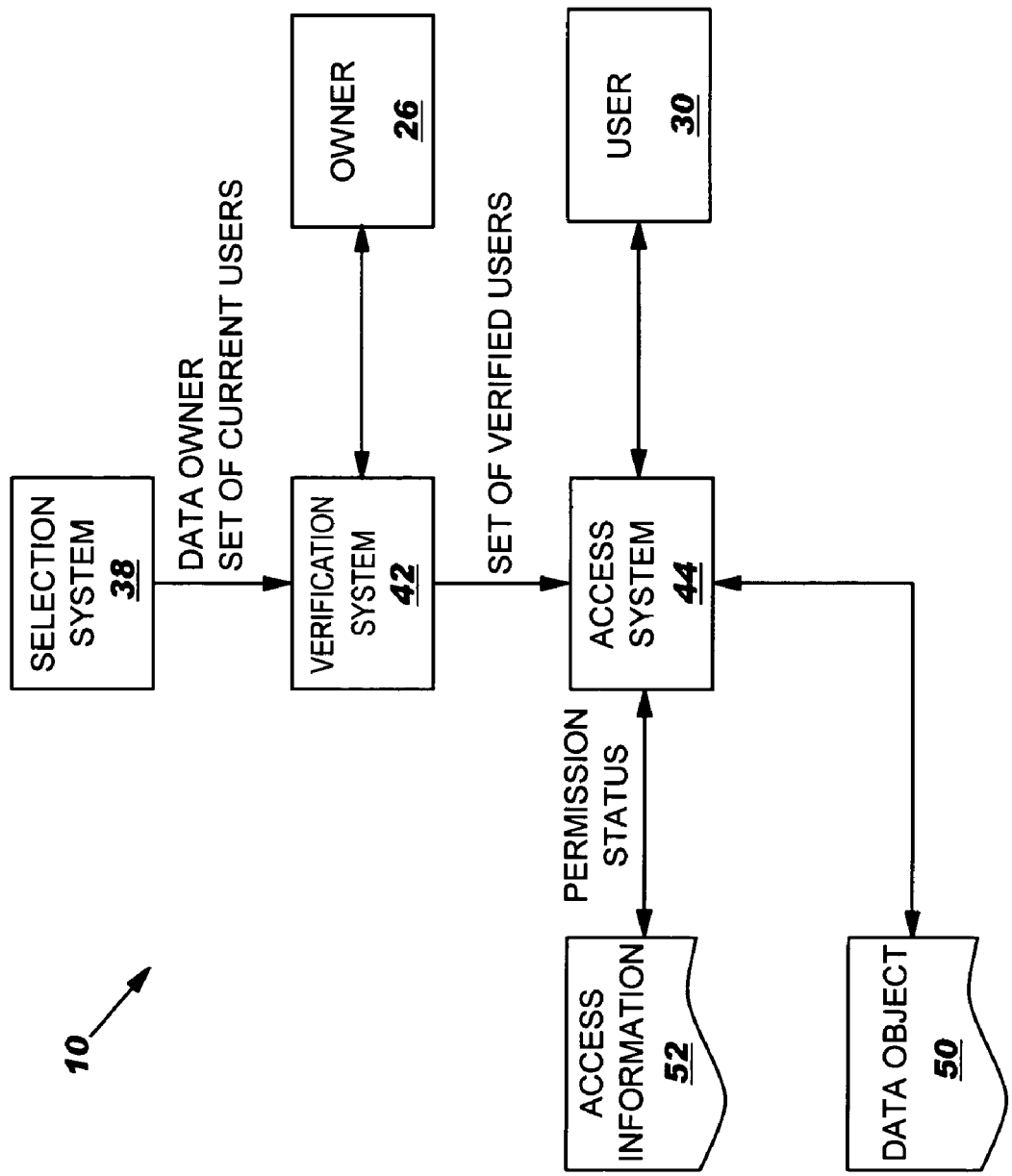

METHOD, SYSTEM AND PROGRAM PRODUCT FOR VERIFYING ACCESS TO A DATA OBJECT

BACKGROUND OF THE INVENTION

1. Technical Field

The invention relates generally to verifying user access to a data object, and more particularly to a solution that automatically determines when access to the data object requires verification and assists an owner of the data object in verifying the access.

2. Background Art

Many companies limit the number of users that can access a certain data object (e.g., a database, directory, file, etc.). To this extent, some companies require that the access privileges of users be periodically reviewed in order to ensure that it remains current. For example, the data object can have an associated owner that is responsible for managing it. The owner may be required to periodically (e.g., annually) verify that access privileges to the data object are current. Further, the owner may be required to maintain a history of the verifications performed for the data object.

To date, a data object owner often must remember when the access is due to be verified, and maintain his/her own records of having performed these verifications. Further, the data object owner frequently must obtain information from various sources in order to perform the verification. For example, the data object owner may first need to determine all users that currently have access rights, and then determine which users, if any, have left the company, changed jobs/divisions, etc. In some cases, the data object owner may not have ready access to the necessary information, thereby requiring assistance from co-workers and delay in completing the verification. As a result, access verification is frequently a time consuming, tedious task that frequently fails to be consistently and reliably performed.

Some solutions have been proposed to automate this process. For example, user access rights can be compared to an employee directory, and those that do not appear in the employee directory can be automatically purged. However, these solutions often unintentionally remove the access rights for some users. For example, a user can be created that is shared by a group of people (e.g., "guest"), that is associated with a non-employee, etc. Therefore, it is often necessary to maintain some human oversight of the verification process.

As a result, a need exists for an improved solution for verifying access to a data object. In particular, a need exists for a method, system and program product that automatically determine whether access to the data object requires verification, and provides an owner of the data object with a set of current users that have access to the data object. The set of current users can include attribute information obtained from an employee database or the like to assist the owner in verifying the access rights.

SUMMARY OF THE INVENTION

The invention provides a solution for verifying access to a data object. Specifically, the invention automatically determines when access to a data object requires verification, and provides an owner of the data object a set of current users that currently can access it. The set of current users can be selected from a set of current user groups and a set of additional users that currently have access to the data object. In one embodiment, an indication of one or more attributes of each user in the set of current users is also provided to the owner. The owner can review the set of current users and respond appropriately. For example, the owner can respond by providing a set of verified users. Access information, such as a verification history and the set of current users, can be updated based on the response from the owner. As a result, the invention provides an improved solution for verifying access to the data object.

A first aspect of the invention provides a computer-implemented method of verifying access to a data object, the method comprising: automatically determining whether access to the data object requires verification; obtaining an owner for the data object; obtaining a set of current users having access to the data object; providing the set of current users to the owner; and receiving a set of verified users.

A second aspect of the invention provides a computer-implemented method of requesting verification of access to a data object, the method comprising: obtaining a frequency period for verifying access to the data object; obtaining a previous time that the access was verified for the data object; determining that the frequency period has passed since the previous time; obtaining an owner for the data object; and sending a request to the owner to verify access to the data object.

A third aspect of the invention provides a system for verifying access to a data object, the system comprising: a monitor system for automatically determining when access to the data object requires verification; an owner system for obtaining an owner for the data object; a selection system for obtaining a set of current users having access to the data object; and a verification system for providing the set of current users to the owner.

A fourth aspect of the invention provides a program product stored on a recordable medium for verifying access to a data object, which when executed comprises: program code for automatically determining when access to the data object requires verification; program code for obtaining an owner for the data object; program code for obtaining a set of current users having access to the data object; and program code for providing the set of current users to the owner.

A fifth aspect of the invention provides a system for deploying an application for requesting verification of access to a data object, the system comprising: a computer infrastructure being operable to: automatically determine when access to the data object requires verification; obtain an owner for the data object; obtain a set of current users having access to the data object; and provide the set of current users to the owner.

A sixth aspect of the invention provides computer software embodied in a propagated signal for verifying access to a data object, the computer software comprising instructions to cause a computer system to perform the following functions: automatically determine when access to the data object requires verification; obtain an owner for the data object; obtain a set of current users having access to the data object; provide the set of current users to the owner; receive a set of verified users; and update the set of current users based on the set of verified users.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIGS. 2A-B show an illustrative data flow for the system shown in FIG. 1; and

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for verifying access to a data object. Specifically, the invention automatically determines when access to a data object requires verification, and provides an owner of the data object a set of current users that currently can access it. The set of current users can be selected from a set of current user groups and a set of additional users that currently have access to the data object. In one embodiment, an indication of one or more attributes of each user in the set of current users is also provided to the owner. The owner can review the set of current users and respond appropriately. For example, the owner can respond by providing a set of verified users. Access information, such as a verification history and the set of current users, can be updated based on the response from the owner. As a result, the invention provides an improved solution for verifying access to the data object.

Figure 1:
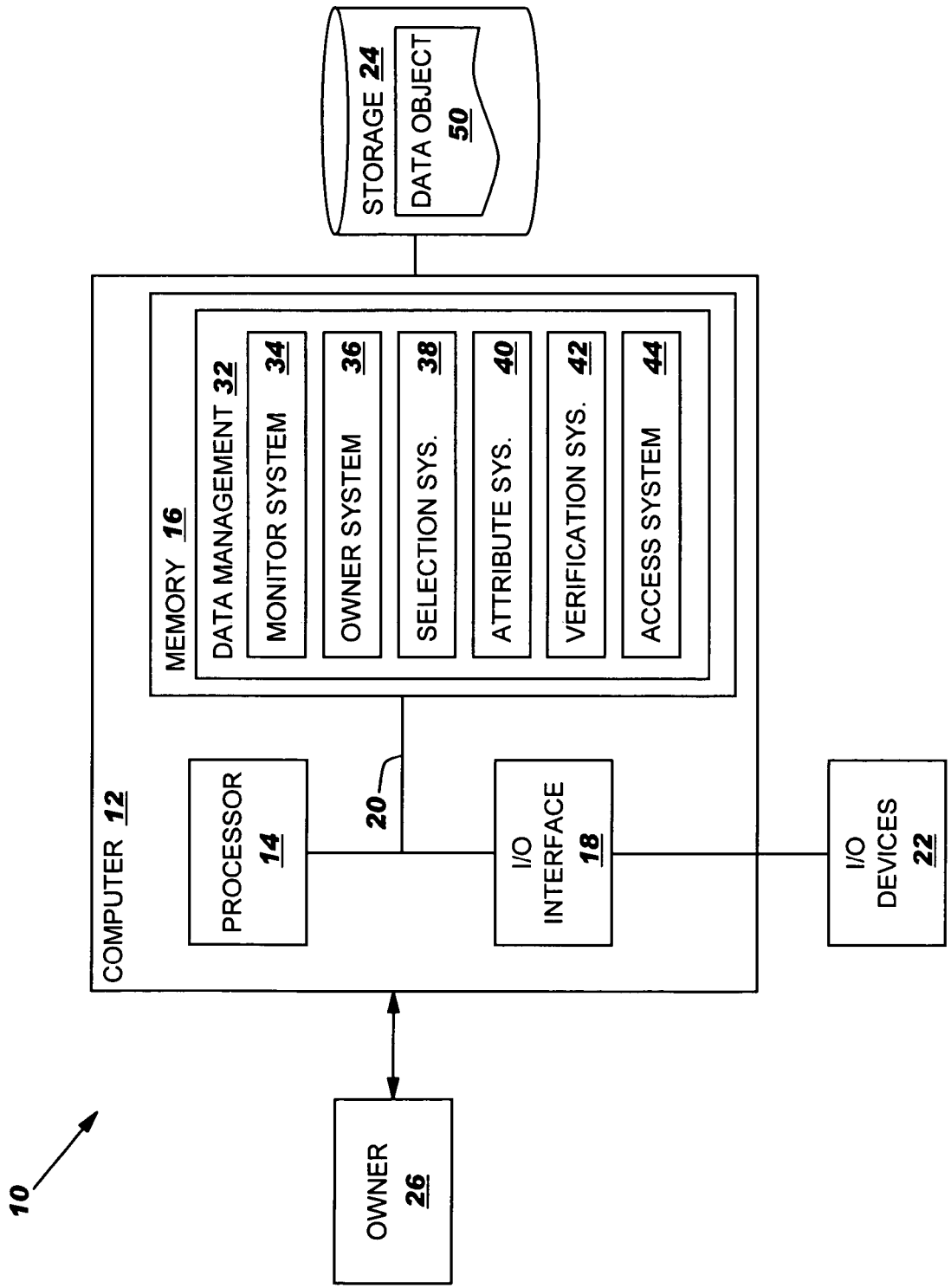
FIG. 1 shows an illustrative system for verifying access to a data object.

Turning to the drawings, FIG. 1 shows an illustrative system 10 for verifying access to a data object 50. In general, computer 12 can manage access to data object 50 that is stored, for example, on a storage system 24. Computer 12 can automatically determine whether access to data object 50 requires verification, and if so, provide an owner 26 of data object 50 a set (zero or more) of current users having access to data object 50. Subsequently, computer 12 can receive a set of verified users, and the set of current users having access to data object 50 can be updated accordingly.

It is understood that "owner" means any user or users that has/have a responsibility to manage the data object 50 and the content thereof. For example, data object 50 could comprise a project specification and owner 26 could comprise a manager for the project. To this extent, data object 50 can comprise any combination of various types of data including a file, a directory, a database, a table in a database, etc. For example, data object 50 could comprise a database created and managed using Lotus Notes® offered by International Business Machines of Armonk, N.Y. In this case, the set of current users can be obtained from an access list maintained for data object 50 by Lotus Notes®.

It is understood that the set of current users can include a set (zero or more) of current user groups that each enables access to a group of users that belong to the user group. For example, a group of users having an administrator attribute can be provided access to data object 50. In this case, access can be granted based on the administrator attribute and not on any particular user identifier (e.g., user name). Further, the set of current users can comprise a set (zero or more) of additional users. Each additional user could comprise a user identifier for a particular individual having access to data object 50, a shared user identifier (e.g., "guest"), or an identifier for one or more automated processes that access data object 50. For example, an individual that has been specifically granted access to data object 50 (e.g., by user identifier) apart from any attribute can be included in the set of current users.

As shown, computer 12 generally includes a processor 14, a memory 16, an input/output (I/O) interface 18, a bus 20, external I/O devices/resources 22, and a storage system 24. Processor 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Storage system 24 may comprise any type of data storage for providing storage for information necessary to carry out the invention as described herein. As such, storage system 24 may include one or more storage devices, such as a magnetic disk drive or an optical disk drive. Moreover, similar to processor 14, memory 16 and/or storage system 24 may reside at a single physical location, comprising one or more types of data storage, or be distributed across a plurality of physical systems in various forms. Further, memory 16 and/or storage system 24 can include data distributed across, for example, a LAN, WAN or a storage area network (SAN) (not shown).

I/O interface 18 may comprise any system for exchanging information to/from one or more external I/O devices 22. I/O devices 22 may comprise any known type of device capable of exchanging information with one or more other computer systems and/or users (e.g., owner 26). Bus 20 provides a communication link between each of the components in computer 12 and likewise may comprise any known type of transmission link, including electrical, optical, wireless, etc. In addition, although not shown, additional components, such as system software, may be incorporated into computer 12. Further, it is understood that computer 12 can comprise any type of computing device such as a server, a desktop computer, a laptop, a handheld device, a mobile phone, a pager, a personal data assistant, etc. It is understood, however, that if computer 12 is a handheld device or the like, a display could be contained within computer 12, and not as an external I/O device 22 as shown.

Additionally, communications between computer 12 and owner 26 can occur over a network (not shown) that comprises one or more intermediate computer systems. In this case, the network can comprise any type of communications link. For example, the network can comprise an addressable connection in a client-server (or server-server) environment that may utilize any combination of wireline and/or wireless transmission methods. In this instance, computer 12 and the other computer system(s) may utilize conventional network connectivity, such as Token Ring, Ethernet, WiFi or other conventional communications standards. Further, the network can comprise any type of network, including the Internet, a wide area network (WAN), a local area network (LAN), a virtual private network (VPN), etc. Where communication with computer 12 occurs via the Internet, connectivity could be provided by conventional TCP/IP sockets-based protocol, and a computer system could utilize an Internet service provider to establish connectivity to computer 12.

Computer 12 is shown including a data management system 32 implemented as computer program code that is stored in memory 16. Data management system 32 can manage access to data object 50 stored in storage system 24. To this extent, data management system 32 is shown including a monitor system 34 that can determine when access to data object 50 requires verification, an owner system 36 that can obtain the owner 26 for data object 50, a selection system 38 that can obtain a set of current users having access to data object 50, and an attribute system 40 that can obtain one or more attributes for a user/user group. Verification system 42 can provide the set of current users to owner 26 and receive a set of verified users from owner 26, and an access system 44 can update the set of current users based on the set of verified users. It is understood that some of the various systems shown in data management system 32 can be implemented independently, combined, and/or stored in memory for one or more separate computers 12 that communicate over a network. Further, it is understood that some of the systems and/or functionality may not be implemented, or additional systems and/or functionality may be included as part of system 10.

Figure 3:
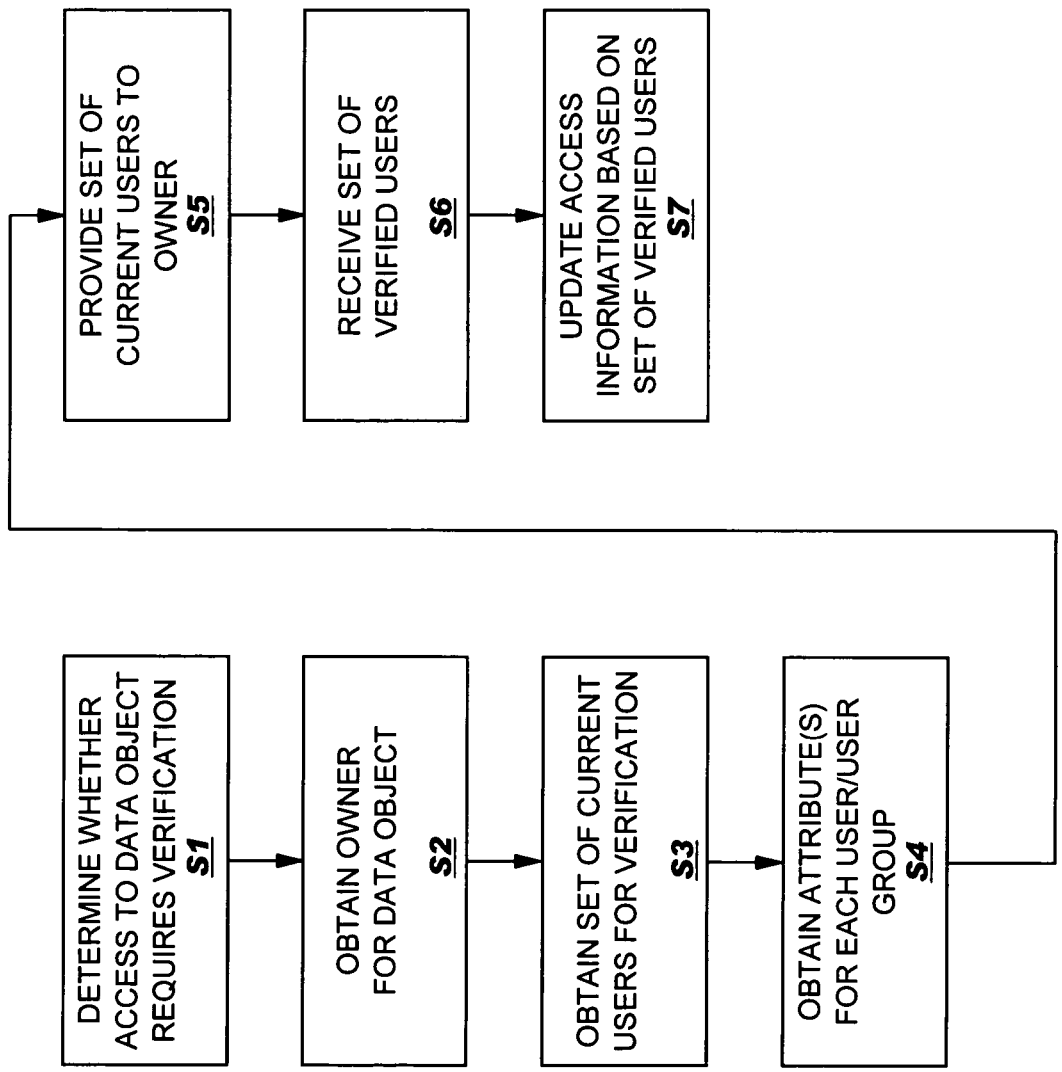
FIG. 3 shows illustrative method steps for verifying access to a data object.

The invention is described further with reference to FIGS. 2A-B, which show an illustrative data flow diagram for system 10 and FIG. 3, which shows illustrative method steps for verifying access to data object 50. In step S1 of FIG. 3, monitor system 34 can automatically determine whether access to data object 50 requires verification. For example, monitor system 34 can comprise an agent (e.g., process or task) that periodically (e.g., every night at midnight) reads access information 52 for data object 50 to determine if verification is required. In one embodiment, access information 52 can be stored in, for example, storage system 24 (FIG. 1). Access information 52 can comprise data about users that can access data object 50. Further, access information 52 can comprise data about when the access rights have been verified as well as a time period for when the access will need to be verified again. Still further, access information 52 can comprise an identification of owner 26 of data object 50.

In any event, monitor system 34 can determine whether access to data object 50 requires verification using access information 52. For example, monitor system 34 can obtain a frequency period for verifying access to data object 50 and a previous time that access was verified for data object 50 from access information 52. The frequency period can comprise any length of time that is allowed to pass before access to data object 50 should be verified. For example, the frequency period could comprise one year, six months, or the like, while the previous time can comprise a timestamp for the last time that access to data object 50 was verified. Monitor system 34 can use the frequency period, previous time, and a current time to determine if the frequency period has passed since access to data object 50 was verified (e.g., the previous time).

When monitor system 34 determines that access to data object 50 requires verification, flow can proceed to step S2, in which owner system 36 can obtain owner 26 for data object 50. In one embodiment, owner system 36 obtains owner 26 from access information 52. For example, monitor system 34 can provide an identifier for data object 50 to owner system 36, which can then obtain the corresponding owner 26 stored in access information 52. Alternatively, owner system 36 could determine owner 26 from the users that currently have access to data object 50. For example, owner system 36 could determine owner 26 based on the privileges that the users have to access data object 50 (e.g., read only, read/write, read/write/delete, etc.), attributes of the current users (e.g., manager, salesperson, etc.), and/or the like. Still further, owner system 36 could display some or all of the users to an administrator 28 that could select owner 26 from the users that currently have access to data object 50.

In any event, in step S3, selection system 38 can obtain a set of current users that have access to data object 50 and require verification. In one embodiment, selection system 38 obtains the set of current users from access information 52 based on data object 50. Selection system 38 can obtain all users that currently have access to data object 50 or a subset of the users that have access to data object 50. For example, some users can comprise administrators 28 that maintain storage system 24 (FIG. 1) on which data object 50 is stored (e.g., a database server). As such, these users can have access to all data stored in storage system 24, and verification of the access rights for these users may not be required.

In one embodiment, selection system 38 generates the set of current users by selecting from a set of current user groups and a set of additional users. In particular, selection system 38 can automatically select some or all of the current user groups and/or additional users for inclusion in the set of current users based on, for example, one or more attributes of each user group/additional user. For example, all user groups/additional users that do not have an administrative attribute could be selected. Alternatively, selection system 38 can display all current user groups and additional users that have access to data object 50 to an administrator 28. Administrator 28 can selectively remove those current user groups and/or additional users that do not require verification. Still further, administrator 28 can remove access for one or more current user groups and/or additional users that administrator 28 is aware should no longer have access to data object 50.

In step S4, selection system 38 also can obtain one or more attributes for each user/user group included in the set of current users to assist owner 26 in verifying access to data object 50. For example, selection system 38 can include the access rights that each user/user group has been granted to data object 50. Additionally, selection system 38 can list the users that belong to each user group. For each user, selection system 38 can obtain the attribute(s) from an attribute system 40. In particular, attribute system 40 can obtain one or more attributes from a set of user attributes 54, and provide the attribute(s) to selection system 38. For example, attribute system 40 can provide a job title, a user property (e.g., administrator), a department, etc. Further, selection system 38 can obtain an indication of the employment status for each user. In this case, when the user is not a current employee, selection system 38 can generate some indication (e.g., highlight the user) that will bring this fact to the attention of owner 26. Additionally, selection system 38 can generate some indication when one or more attributes have changed since the previous verification. For example, a user could have changed departments since access to data object 50 has been previously verified.

Once generated, selection system 38 can provide the set of current users to verification system 42 for verification. In step S5, verification system 42 provides the set of current users to owner 26. Owner 26 can review the set of current users and respond accordingly. In one embodiment, user 26 can respond with a set of verified users. For example, verification system 42 can generate an electronic message that comprises a description of data object 50 and the set of current users, and send the electronic message to owner 26. Owner 26 can respond to the electronic message indicating that the set of current users is correct and/or incorporating one or more modifications (e.g., deletions) to the set of current users.

Alternatively, verification system 42 can generate a display that allows owner 26 to review the set of current users, make one or more modifications to the set of current users, and provide verification system 42 with the set of verified users. The display could be viewed by owner 26 using, for example, browser software as is known in the art. Owner 26 can use the display to remove and/or add one or more users/user groups to/from the set of current users, obtain one or more additional attributes on a user/user group from attribute system 40, etc. Additionally, owner 26 could alter the access rights for one or more users/user groups (e.g., from read/write to read). Subsequently, once any desired revisions have been performed, owner 26 can provide the set of current users to verification system 42 as the set of verified users.

Still further, verification system 42 can send owner 26 an electronic message that reminds owner 26 that access to data object 50 is required. Owner 26 can then use a display to verify access to data object 50 as discussed above. Additionally, owner 26 could comprise an owner of a plurality of data objects 50. In this case, the display can comprise a hierarchy or the like for displaying related data objects 50 (e.g., by project) together. Each data object 50 that requires verification can be highlighted, separately listed, etc., to allow for ready access by owner 26.

In step S6, verification system 42 receives the set of verified users, and can provide it to an access system 44. For example, owner 26 can respond to an electronic message, invoke an operation on a display (e.g., click on a submit button), etc. In step S7, access system 44 can update access information 52 based on the set of verified users. For example, access system 44 can update the previous time that access to data object 50 was verified. Additionally, access system 44 can update the set of current users using the set of verified users. In particular, access system 44 can use the set of verified users to add/remove/modify users/user groups that have access to data object 50.

In general, the current invention verifies access to data object 50 to ensure that no user 30 can access data object 50 that he/she should no longer be able to access. However, owner 26 may not immediately verify access to data object 50. To this extent, access system 44 can prevent one or more users 30 from accessing data object 50 until verification of the set of current users is complete. For example, after providing the set of current users to owner 26 for verification, verification system 42 can store the time that verification was requested and indicate a status of the verification as pending in access information 52. When user 30 attempts to access data object 50, access system 44 can determine the status of the verification. If the verification status has been pending for an extended period (e.g., more than one week), access system 44 can prevent any access to data object 50 until the set of verified users is received and the set of current users is updated. Alternatively, access system 44 could limit the type of access that is allowed. For example, user 30 could be provided read access, but not be allowed to make any modifications to data object 50 until the verification is complete.

It should be appreciated that the teachings of the present invention could be offered as a business method on a subscription or fee basis. For example, data management system 30 (FIG. 1) could be created, maintained, supported, and/or deployed by a service provider that offers the functions described herein for customers. That is, a service provider could verify access to data as described above. It is understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer-implemented method executed on at least one computer device, of verifying access to a data object, the method comprising:
   automatically determining, on the at least one computer device, whether a privilege of a user for access to the data object requires verification, the determining including:
      determining whether a frequency period for verifying access to the data object has passed since a previous time that access was verified for the data object;
   obtaining an owner for the data object on the at least one computer device;
   obtaining on the at least one computer device, a set of current users having access to the data object, the set of current users including all users having privileges that allow the users to request access the data object at present time independent of whether the users are currently accessing the data object;
   providing the set of current users to the owner;
   receiving on the computer device, a set of verified users based on the set of current users, the set of verified users including all users whose status as a user has been verified by the owner for access to the data object; and
   updating the previous time after receiving the set of verified users.

2. The method of claim 1, further comprising updating the set of current users based on the set of verified users.

3. The method of claim 2, further comprising preventing access to the data object until the set of current users has been updated.

4. The method of claim 1, wherein the obtaining a set of current users step comprises:
   determining a set of current user groups that have access to the data object;
   determining a set of additional users; and
   generating the set of current users by selecting from the set of current user groups and the set of additional users.

5. The method of claim 1, further comprising, for each user in the set of current users:
   determining if the user is a current employee; and
   indicating whether the user comprises a current employee.

6. The method of claim 1, wherein the providing step comprises:
   generating an electronic message that comprises a description of the data object and the set of current users; and
   sending the electronic message to the owner.

7. A computer-implemented method of requesting verification of access to a data object, implemented on at least one computer device, the method comprising:

obtaining a frequency period on the at least one computer device, for verifying whether each user of the data object should continue to have access to the data object, the frequency period being a pre-determined period of time during which privileges that allow the users to request access the data object at present time independent of whether the users are currently accessing the data object;

obtaining a previous time on the at least one computer device, that the access was verified for the data object;

determining on the at least one computer device, that the frequency period has passed since the previous time;

obtaining on the at least one computer device, an owner for the data object;

obtaining a set of current users having access to the data object, the obtaining comprising:
- determining a set of current user groups that have access to the data object;
- determining a set of additional users; and
- generating the set of current users by selecting from the set of current user groups and the set of additional users;

providing the set of current users to the owner; and sending a request to the owner to verify access to the data object.

8. The method of claim 7, further comprising, for each user in the set of current users:
obtaining at least one attribute for the user; and
indicating the at least one attribute to the owner.

9. A system for verifying access to a data object, the system comprising:
at least one computer device including:
a monitor system for automatically determining when a privilege of a user for access to the data object requires verification, the determining including:
determining whether a frequency period for verifying access to the data object has passed since a previous time that access was verified for the data object;
an owner system for obtaining an owner for the data object;
a selection system for obtaining a set of current users having access to the data object, the set of current users including all users having privileges that allow the users to request access the data object at present time independent of whether the users are currently accessing the data object;
a verification system for providing the set of current users to the owner and receiving a set of verified users based on the set of current users, the set of verified users including all users whose status as a user has been verified by the owner for access to the data object; and
an access system for updating the set of current users based on the set of verified users.

10. The system of claim 9, further comprising an attribute system for obtaining at least one attribute for each user in the set of current users.

11. A program product stored on a computer-recordable storage medium for verifying access to a data object, which when executed comprises:
program code for automatically determining when a privilege of a user for access to the data object requires verification, the determining including:
determining whether a frequency period for verifying access to the data object has passed since a previous time that access was verified for the data object;
program code for obtaining an owner for the data object;
program code for obtaining a set of current users having access to the data object, the set of current users including all users having privileges that allow the users to request access the data object at present time independent of whether the users are currently accessing the data object;
program code for providing the set of current users to the owner;
program code for receiving a set of verified users based on the set of current users, the set of verified users including all users whose status as a user has been verified by the owner for access to the data object; and
program code for updating the set of current users based on the set of verified users.

12. The program product of claim 11, further comprising program code for indicating each user in the set of current users that is not a current employee.

13. A system for deploying an application for requesting verification of access to a data object, the system comprising:
a computer infrastructure being operable to:
automatically determine when a privilege of a user for access to the data object requires verification, the determining including:
determining whether a frequency period for verifying access to the data object has passed since a previous time that access was verified for the data object;
obtain an owner for the data object;
obtain a set of current users having access to the data object, the set of current users including all users having privileges that allow the users to request access the data object at present time independent of whether the users are currently accessing the data object; and
provide the set of current users to the owner;
receive a set of verified users based on the set of current users, the set of verified users including all users whose status as a user has been verified by the owner for access to the data object; and
update the previous time after receiving the set of verified users.

14. The system of claim 13, wherein the computer infrastructure is further operable to indicate at least one attribute for each user in the set of current users.

* * * * *